(12) United States Patent
Du et al.

(10) Patent No.: US 12,083,843 B2
(45) Date of Patent: Sep. 10, 2024

(54) DAMPER SPRING SUPPORT AND VEHICLE AXLE HAVING THE SAME

(71) Applicant: Shanghai Linghuo Trading Co., LTD., Shanghai (CN)

(72) Inventors: Dehui Du, Shanghai (CN); Jia Fu, Shanghai (CN)

(73) Assignee: SHANGHAI LINGHUO TRADING CO., LTD., Shanghai (CN)

( * ) Notice: Subject to any disclaimer, the term of this patent is extended or adjusted under 35 U.S.C. 154(b) by 0 days.

(21) Appl. No.: 18/099,259

(22) Filed: Jan. 19, 2023

(65) Prior Publication Data

US 2023/0241938 A1 Aug. 3, 2023

(30) Foreign Application Priority Data

Jan. 30, 2022 (CN) .......................... 202220246509.4

(51) Int. Cl.
*B60G 15/07* (2006.01)

(52) U.S. Cl.
CPC .......... *B60G 15/07* (2013.01); *B60G 2204/12* (2013.01); *B60G 2204/4304* (2013.01); *B60G 2204/4306* (2013.01)

(58) Field of Classification Search
CPC .. B60G 15/07; B60G 15/067; B60G 2204/12; B60G 2204/4304; B60G 2204/4306; B60B 35/007
See application file for complete search history.

(56) References Cited

U.S. PATENT DOCUMENTS

| | | | | |
|---|---|---|---|---|
| 1,901,287 A | * | 3/1933 | Corriveau | B60G 11/113 267/52 |
| 3,730,508 A | * | 5/1973 | Marian | B60G 11/113 267/52 |
| 5,046,756 A | * | 9/1991 | Hertrick | B60G 11/107 280/124.17 |
| 5,647,606 A | * | 7/1997 | Jordan | B62D 17/00 280/86.751 |
| 7,360,774 B2 | * | 4/2008 | Saieg | B60G 7/001 280/124.13 |
| 7,954,833 B1 | * | 6/2011 | Heath | B60G 9/003 280/124.116 |
| 8,632,085 B2 | * | 1/2014 | Davenport | B60G 9/003 280/124.128 |
| 9,718,321 B2 | * | 8/2017 | Schewerda | B62D 7/163 |

(Continued)

FOREIGN PATENT DOCUMENTS

| | | |
|---|---|---|
| CN | 217197640 U | 8/2022 |
| DE | 19818698 A1 | 6/1999 |

(Continued)

*Primary Examiner* — Frank B Vanaman
(74) *Attorney, Agent, or Firm* — Cheng-Ju Chiang

(57) ABSTRACT

A damper spring support includes: a first angle adjustment mechanism configured for being fixed to a vehicle body; a support base configured for supporting a damper spring; and a connection structure configured for detachably fixing the support base to different positions of the first angle adjustment mechanism. If the support base being fixed to different positions of the first angle adjustment mechanism, a damper spring support surface of the support base facing different directions. A vehicle axle having the same is also included.

20 Claims, 7 Drawing Sheets

(56) References Cited

U.S. PATENT DOCUMENTS

| | | | |
|---|---|---|---|
| 2001/0020775 A1* | 9/2001 | Pierce | B60G 7/008 |
| | | | 280/124.128 |
| 2004/0145144 A1* | 7/2004 | De Freitas, Jr. | B60B 35/06 |
| | | | 280/93.512 |
| 2011/0304115 A1* | 12/2011 | Aalderink | B60G 11/27 |
| | | | 248/205.1 |

FOREIGN PATENT DOCUMENTS

| | | |
|---|---|---|
| DE | 202017107581 U1 | 5/2018 |
| KR | 10-2006-0002423 A | 1/2006 |

* cited by examiner

DAMPER SPRING SUPPORT AND VEHICLE AXLE HAVING THE SAME

CROSS REFERENCE TO RELATED APPLICATION

The present patent document claims the benefit of priority of Chinese patent application number 202220246509.4, filed on Jan. 30, 2022, and entitled "DAMPER SPRING SUPPORT AND VEHICLE AXLE HAVING THE SAME". The entire disclosure of the above-identified application is incorporated herein by reference.

TECHNICAL FIELD

The present document relates to automobile structures, in particular to a damper spring support and a vehicle axle having the same.

BACKGROUND

Since the launch of the first off-road vehicle model, the appearance, interior trim, four-wheel drive technology, and power system of the off-road vehicle have made great progress, however, as the core of the chassis, the integral front axle assembly has not been substantially improved.

SUMMARY

The present document discloses, among other things, a damper spring support and a vehicle axle having the same. On the basis of better support of the damper spring, the damper spring support can be used to adjust the orientation angle of a damper spring support surface according to requirement, such that the vehicle can be conveniently fine-tuned without damage to the vehicle.

The damper spring support includes: a first angle adjustment mechanism configured for being fixed to a vehicle body; a support base configured for supporting a damper spring; and a connection structure configured for detachably fixing the support base to different positions of the first angle adjustment mechanism. If the support base is fixed to different positions of the first angle adjustment mechanism, a damper spring support surface of the support base will face different directions.

In some embodiments, fixing points of the support base to the first angle adjustment mechanism are distributed along a circumferential direction of a circle.

In some embodiments, the first angle adjustment mechanism has an arc-shaped first contact surface, the support base has a second angle adjustment mechanism, and the second angle adjustment mechanism has an arc-shaped second contact surface, the support base is capable of being fixed to different positions of the first angle adjustment mechanism with a central axis of the second contact surface forming different angles with a central axis of the first contact surface.

In some embodiments, one of the first angle adjustment mechanism and the second angle adjustment mechanism is provided with a plurality of protrusions, the other one of the first angle adjustment mechanism and the second angle adjustment mechanism is provided with a plurality of depressions, the protrusions or the depressions are arranged along a circumferential direction of a corresponding contact surface, the protrusions each is capable of engaging with several different depressions, making the second contact surface have different installation angles relative to the first contact surface.

In some embodiments, both of the first angle adjustment mechanism and the second angle adjustment mechanism are provided with a plurality of gear teeth arranged at intervals along respective circumferential directions, the protrusions are the gear teeth, and the depressions are formed between adjacent gear teeth.

In some embodiments, a center of a circle which the first or the second contact surface locates is located at side of the support base which is remote from the damper spring support surface.

In some embodiments, the first angle adjustment mechanism has an elongate hole extending along a circumferential direction of a circle, the support base has a connection hole defined therethrough, the connection structure includes a connection bolt for extending through the connection hole and the elongate hole, and a nut for fixing the connection bolt to the support base and the first angle adjustment mechanism.

In some embodiments, the first angle adjustment mechanism includes a first substrate and two first supports disposed at opposite sides of the first substrate, the support base includes a second substrate and two second supports disposed at opposite side of the second substrate, the first substrate has an arc-shaped first contact surface at an upper side thereof, the second substrate has an arc-shaped second contact surface at a lower side thereof, the elongate hole is defined in the first substrate and extends along a circumferential direction of the first contact surface, the connection hole is defined through the second substrate, when the support base is mounted on the first angle adjustment mechanism, the first contact surface contacts with the second contact surface, with the connection blot extending through the connection hole and the elongate hole.

In some embodiments, the second support has an arc-shaped second concave, the second concave is configured for contacting with the vehicle body, and a fixation angle of the second concave relative to the vehicle body varies if the support base is fixed to different positions of the first angle adjustment mechanism.

In some embodiments, the support base further includes a boss and a spacer, the boss and the spacer are disposed at an upper side of the second substrate, the connection hole is defined through the boss and the second substrate, the spacer includes an opening for receiving the boss, when the spacer is disposed on the second substrate, an accommodation space is formed between a side wall of the opening and the boss to accommodate a bottom end of the damper spring.

In some embodiments, when the first angle adjustment mechanism is fixed to the vehicle body, an operation space is formed between the first support, the first substrates and the vehicle body, which is arranged for screwing the nut onto the bolt.

The present document also discloses a vehicle axle, which includes the above damper spring support.

In some embodiments, by the arrangement of the first angle adjustment mechanism and the second angle adjustment mechanism between the vehicle body and the support base, and the formation of the protrusions and the depressions between the first angle adjustment mechanism and the second angle adjustment mechanism, the support base may have different fixing points on the first angle adjustment mechanism. Since the first contact surface and the second contact surface are arc-shaped, when the protrusion engages with different depressions, the damper spring support surface of the support base will face to different directions. Through the above arrangement, if the installation angle of the damper spring needs to be adjusted after the vehicle chassis is lifted, it can be adjusted by changing the relative position of the support base on the first angle adjustment mechanism, which makes the support base have different orientations, such that the installation angle of the damper spring can be adjusted. Therefore, on the basis of better supporting the damper spring, the orientation angle of the support base can be adjusted as required, which facilitates to fine-tune the vehicle without damage.

DETAILED DESCRIPTION OF PREFERRED EMBODIMENTS

Figure 1:
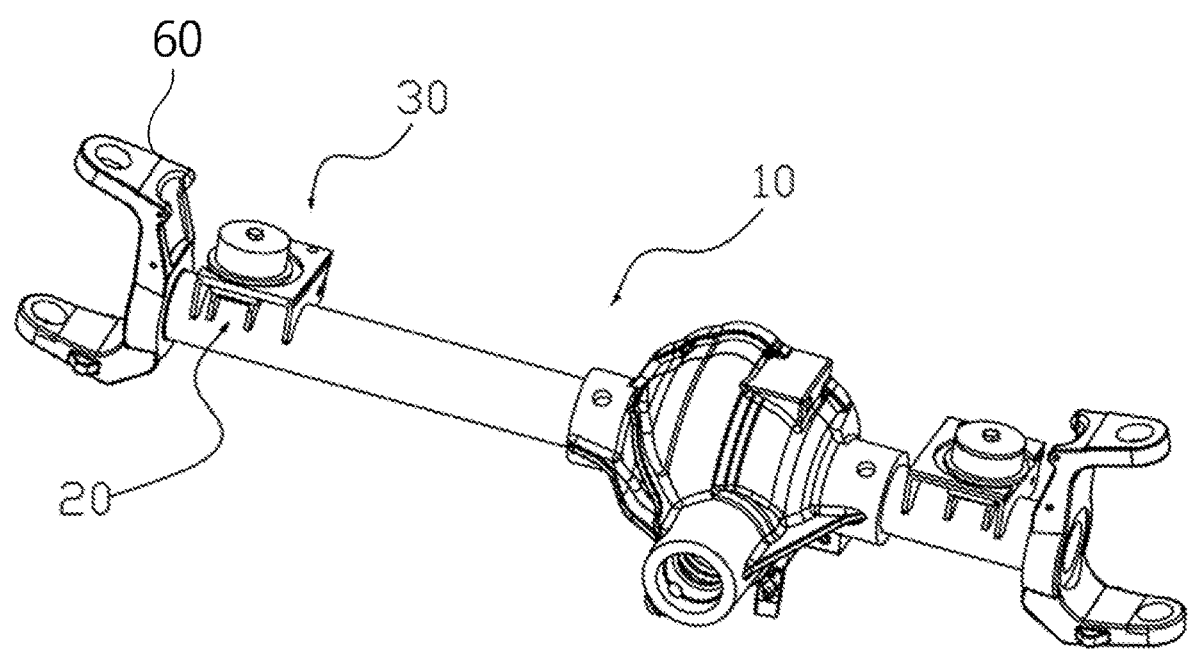
FIG. 1 is a schematic, assembly view of an example of a vehicle axle and a damper spring support.

In order to make the purpose, the technical solutions and the advantages of the present document, various embodiments will be further described in detail.

It should be noted that in the description, terms such as "first" and "second" are used to distinguish similar objects, and are not necessarily used to describe a specific order or sequence. It is to be understood that the data so used are interchangeable under appropriate circumstances such that the embodiments described herein can be practiced in sequences other than those illustrated or described herein.

In the present document, the orientation or positional relationship indicated by the terms "upper", "lower", "top", "bottom", etc. are based on the orientation or positional relationship shown in the drawings, and are only for the convenience of describing and for simplifying the description, rather than indicating or implying that the device or element must have a specific orientation, be constructed and operate in a specific orientation, and thus should not be construed as limitation of the disclosure. The X direction refers to the length direction of a vehicle, the Y direction refers to the width direction of the vehicle, and the Z direction refers to the height direction of the vehicle.

In addition, unless be clearly specified and limited, terms such as "install", "connect", "link" and "fix" in the present document should be interpreted in a broad sense. For example, the term may be used to describe a fixed connection or a detachable connection, or an integration into a single piece; directly connected, or indirectly connected through an intermediary, and may be an internal communication between two elements or an interaction relationship between two elements, unless otherwise clearly defined. For those of ordinary skill in the art the specific meanings of the above terms in the present document can be understood according to specific situations.

BRIEF INTRODUCTION

In the past 25 years, the global sales of off-road vehicles have exceeded 30 million, and consumers' demand for customization and modification of such models is also increasing day by day. For global automakers and modification shops, changing to bigger tires, replacing or enhancing the suspension system to lift the vehicle chassis for better passability, and making the overall appearance of the vehicle more attractive have become the most common ways of customization in the industry. The damper spring is one of the important components of the vehicle. When the vehicle chassis is lifted, the installation angle of the damper spring needs to be changed as well, so as to adapt to the vehicle chassis of different heights.

In the prior art, it is required to frequently weld a spring base in different orientations of the axle tube, and then install the damper spring on the spring base to fine-tune the vehicle. This method is cumbersome and frequent welding, cutting and removing the spring base will cause damage to the axle tube. In some embodiments, the operation difficulty is beyond the competence of ordinary technicians. However, if the orientation of the spring base is not adjusted, the stretching angle of the suspension after lifting will be limited, such that the spring will not be able to release enough stroke when off-road, which will greatly weaken the ability to deal with cross-axis, and runs counter to the original intention of improving passability. Otherwise, this will cause the change of the stress point of the damper spring, which will result in the acceleration of the abnormal attenuation and the deformation of the spring, make the spring can not be perpendicular to the ground, and bring the vehicle swinging when driving.

EMBODIMENTS

In one example aspect, the present document provides a damper spring support and a vehicle axle having the same. On the basis of better support of the damper spring, the damper spring support can adjust the orientation angle of a damper spring support surface as required, which makes the vehicle can be conveniently fine-tuned without damage to the vehicle.

As shown in FIGS. 1 to 7, the damper spring support includes a first angle adjustment mechanism 20, a support base 30 and a connection structure 40. The first angle adjustment mechanism 20 is fixed on a vehicle body, such as a vehicle axle 10. The support base 30 is for supporting a damper spring. The connection structure 40 detachably fixes the support base 30 on the first angle adjustment mechanism 20. The first angle adjustment mechanism 20 has a first contact surface 21 on a side facing the support base 30. Viewed from the left or right side of the first angle adjustment mechanism 20 (when it is installed on the vehicle, and viewed from Y direction of the vehicle), the first contact surface 21 is arc-shaped. The support base 30 has a second angle adjustment mechanism 31 at a side facing the first angle adjustment mechanism 20. The second angle adjustment mechanism 31 has a second contact surface 311 matching with the first contact surface 21. That is, the second contact surface 311 is also arc-shaped. A plurality of protrusions are formed on one of the first contact surface 21 and the second contact surface 311, and a plurality of depressions are formed on the other one of the first contact surface 21 and the second contact surface 311. The plurality of protrusions and the plurality of depressions are arranged at intervals along circumferential directions of its respective contact surfaces. If the support base 30 is arranged on the first angle adjustment mechanism 20, the protrusions each can extend into several different depressions. In this embodiment, by the arrangement of the first angle adjustment mechanism 20 and the second angle adjustment mechanism 31 between the vehicle body and the support base 30, and the formation of the protrusions and the depressions between the first angle adjustment mechanism 20 and the second angle adjustment mechanism 31, the support base 30 may be fixed to different positions of the first angle adjustment mechanism 20, and have different fixing points on the first angle adjustment mechanism 20. Since the first contact surface 21 and the second contact surface 311 are arc-shaped, when the protrusion engages in different depressions, an upper surface of the support base 30, that is, a damper spring support surface will face to different directions. Through the above arrangement, if the installation angle of the damper spring needs to be adjusted after the vehicle chassis is lifted, it can be adjusted by changing the relative position of the support base 30 to the first angle adjustment mechanism 20, which makes the support base 30 have different orientations, such that the installation angle of the damper spring can be adjusted. Therefore, on the basis of better support the damper spring, the orientation angle of the support base 30 can be adjusted as required, which facilitates to fine-tune the vehicle without damage.

Figure 2:
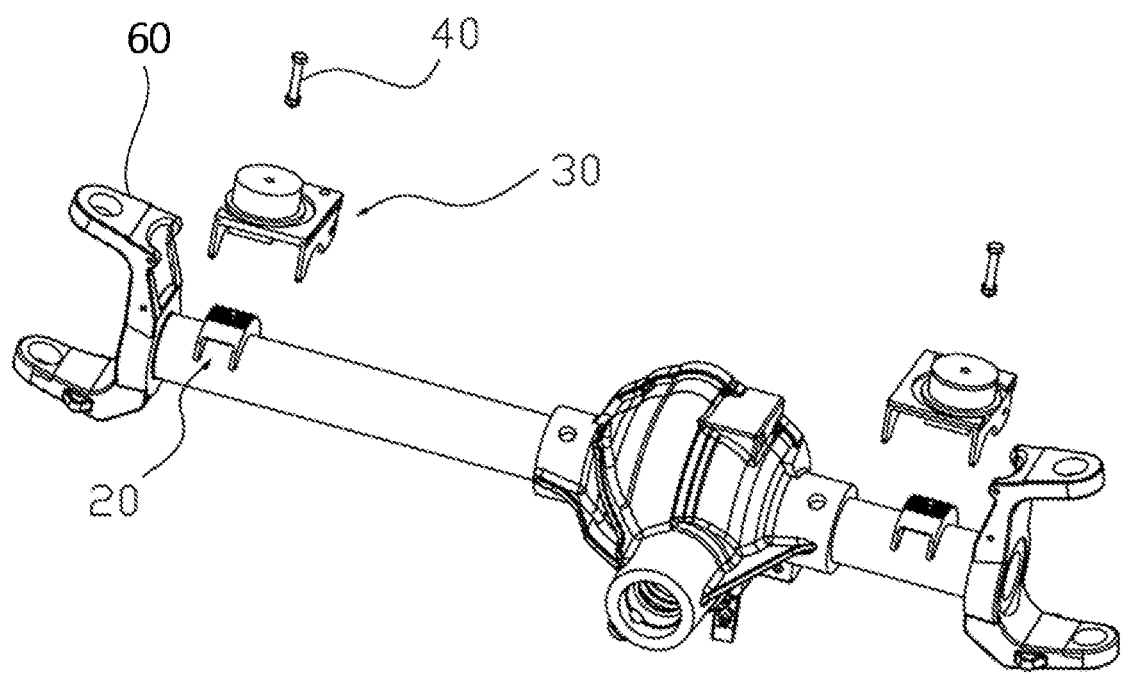
FIG. 2 is a schematic, exploded view of the damper spring support in FIG. 1.
Figure 3:
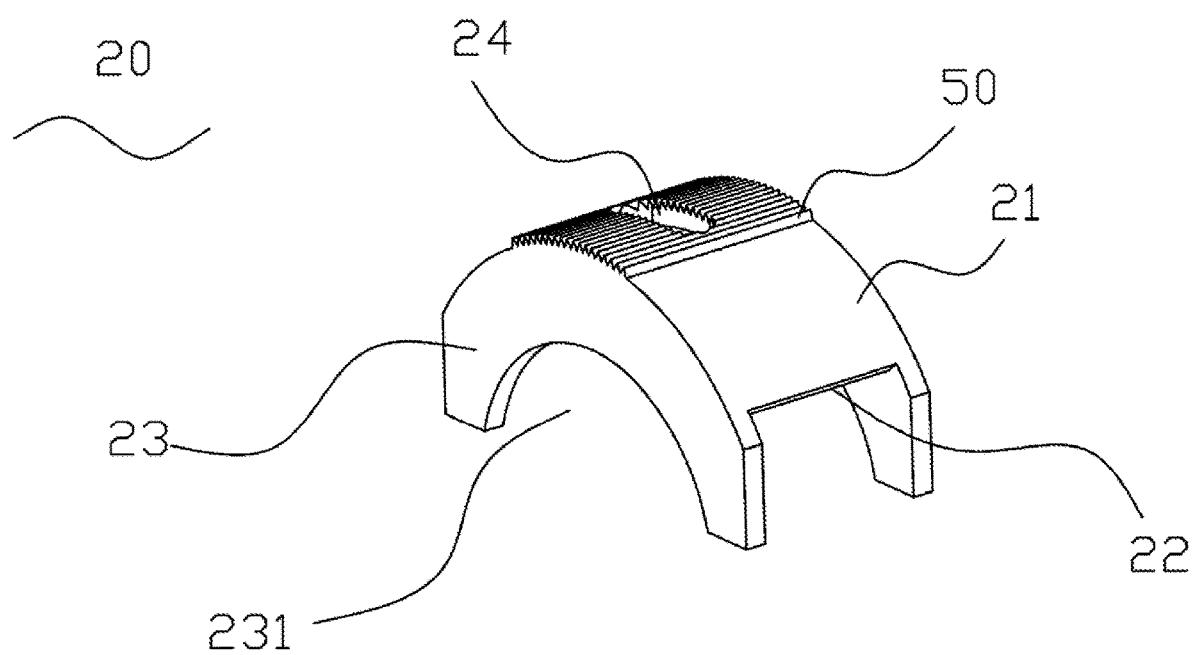
FIG. 3 is a schematic view of a first angle adjustment mechanism in FIG. 1.
Figure 4:
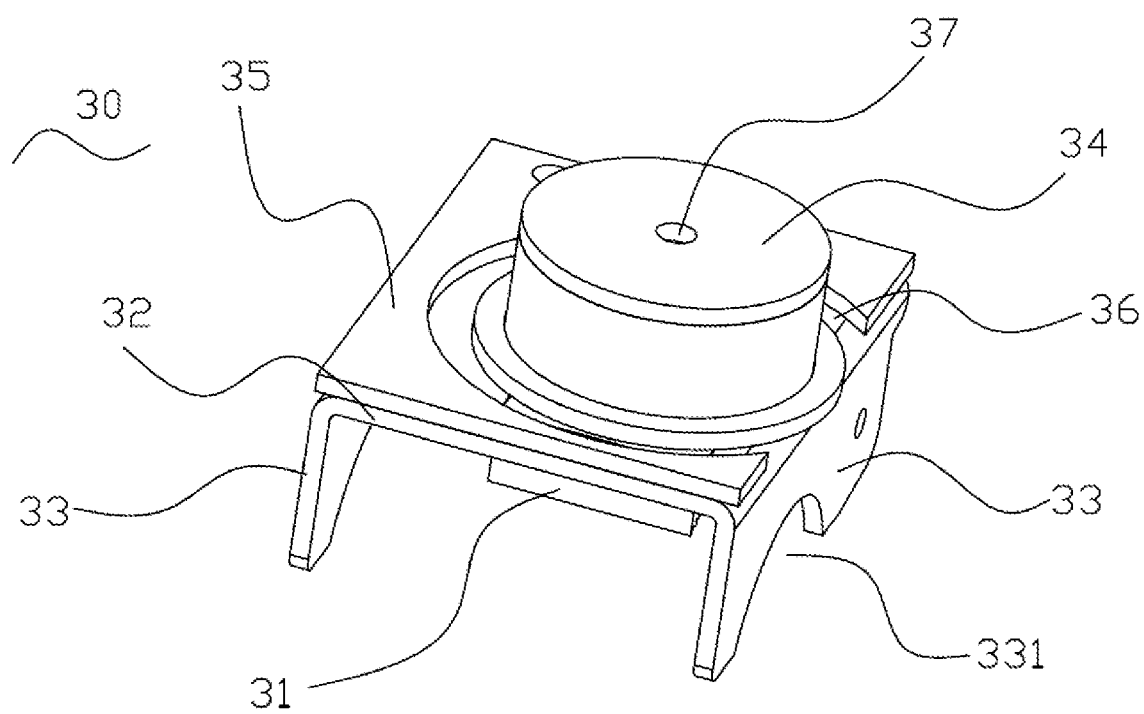
FIG. 4 is a schematic, isometric view of the damper spring support in FIG. 1.
Figure 5:
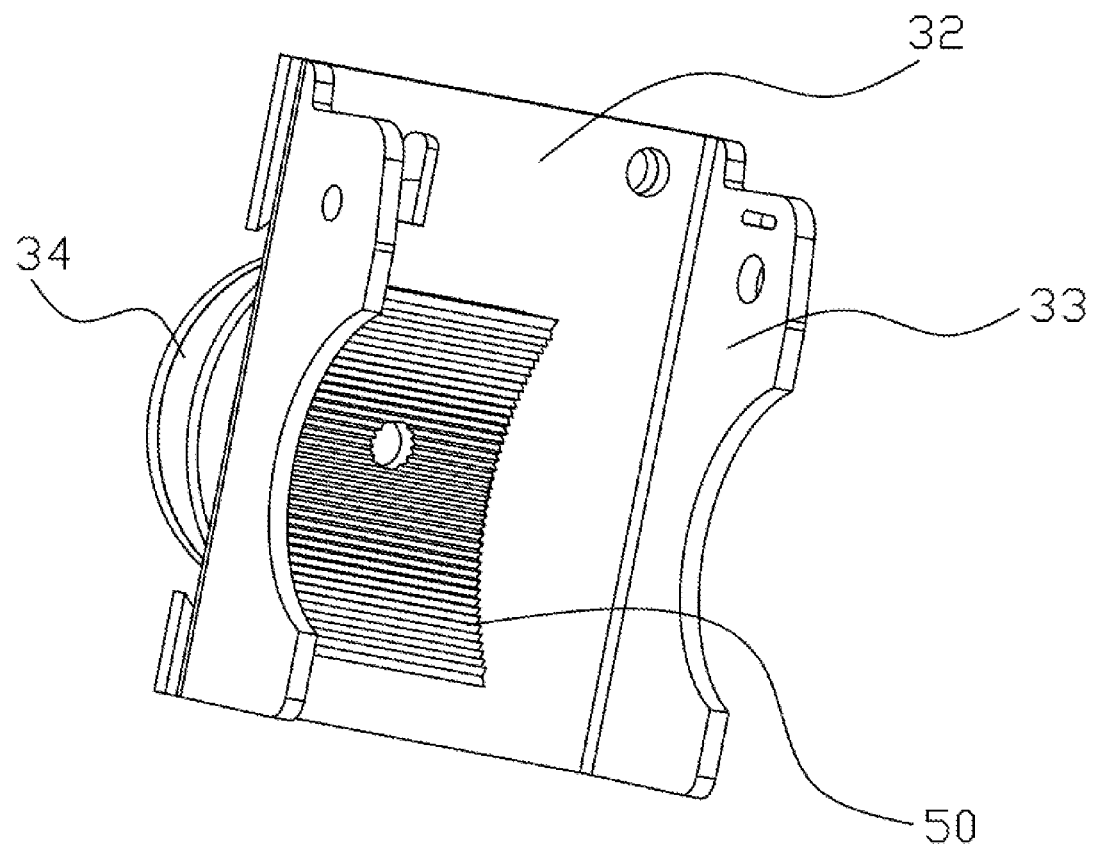
FIG. 5 is another schematic, isometric view of the damper spring support in FIG. 1.
Figure 6:
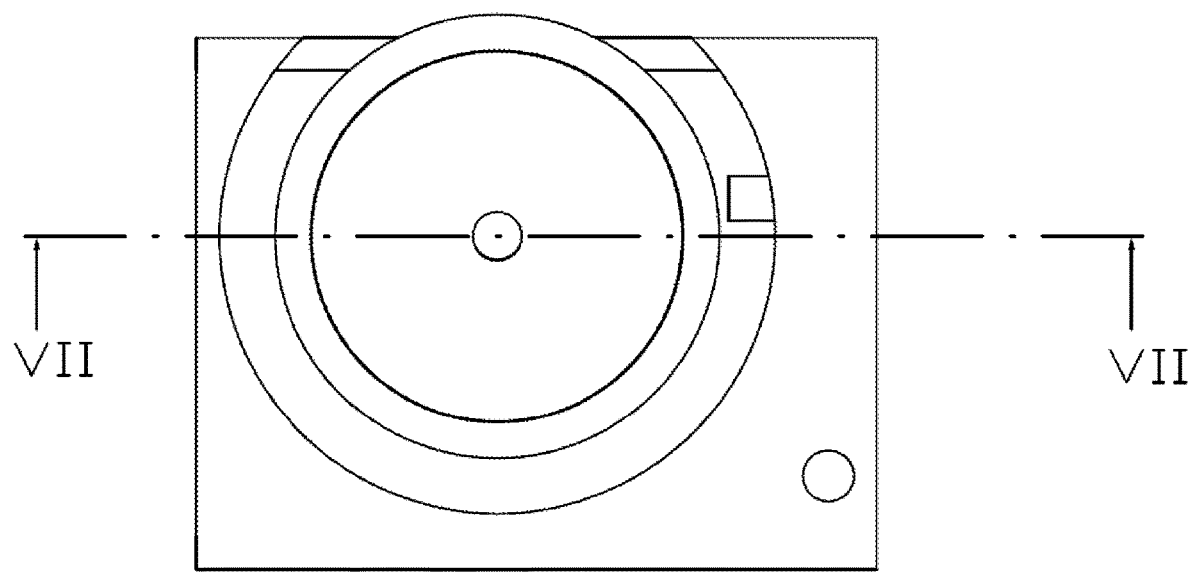
FIG. 6 is a schematic, front view of the damper spring support in FIG. 1.
Figure 7:
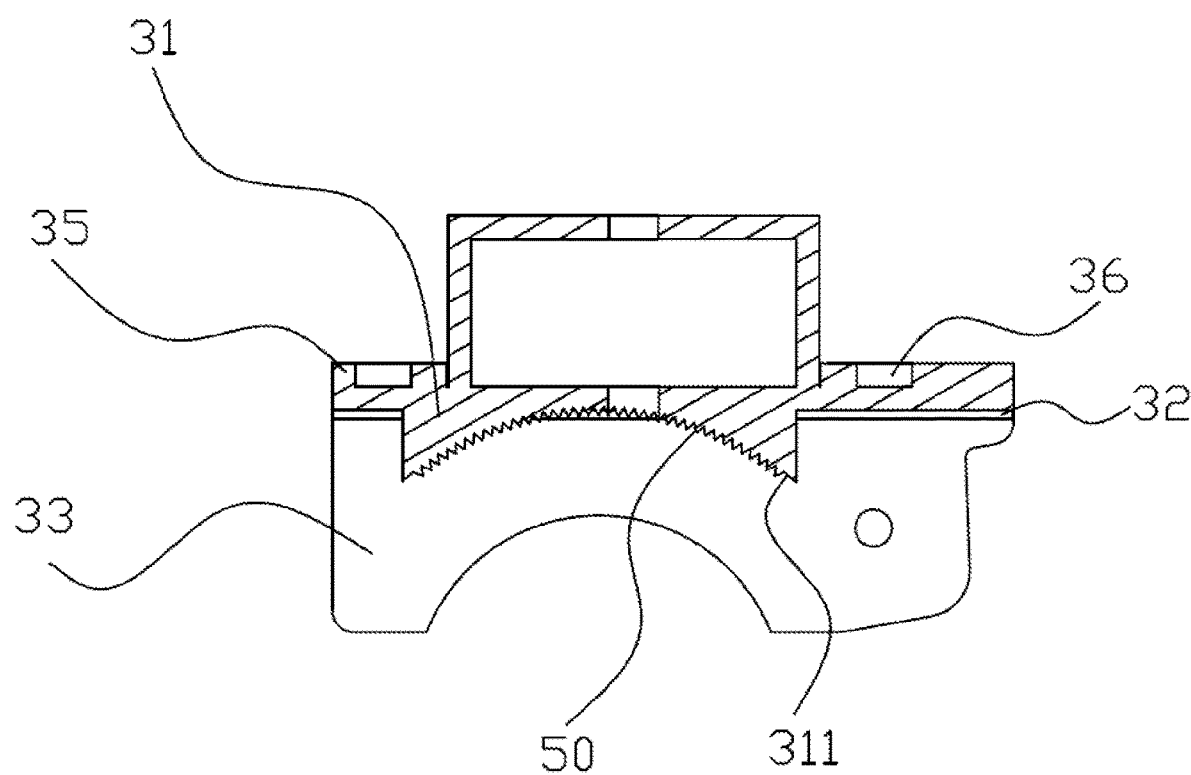
FIG. 7 is a schematic, cross-sectional view taken along line VII-VII of FIG. 6.

As shown in FIG. 2, FIG. 3 and FIG. 5, a plurality of gear teeth 50 are formed on the first contact surface 21 and the second contact surface 311, and arranged at intervals along the circumferential directions, that is, in this embodiment, the protrusions are the gear teeth 50, and the depressions are formed between adjacent gear teeth 50.

In this embodiment, when the damper spring support is installed on the vehicle, the centers of the circles which the first contact surface 21 and the second contact surface 311 locate are both located at a side close to the ground, that is, they are both remote from the damper spring support surface of the support base 30. When it is installed on the vehicle axle 10, the damper spring support is installed above an axle tube, and the center of its curved surface is located on a side where the axis of the axle tube is located. If the protrusion engages in different depressions, a central axis of the second contact surface 311 forms different angles with a central axis of the first contact surface 21, making the support base 30 have different installation angles relative to the first angle adjustment mechanism 20. It should be noted that, the central axes of the contact surfaces are the central axes of the arc-shaped surfaces as viewed from the left or the right side of the contact surfaces. That is, when the damper spring support is mounted on the vehicle axle 10, the central axes of the contact surfaces are the central axes of the arc-shaped surfaces when viewed in Y direction of the vehicle.

As shown in FIG. 3, the first angle adjustment mechanism 20 includes an arc-shaped first substrate 22 and two sector-shaped first supports 23. The first supports 23 are arranged at opposite left and right sides of the first substrate 22, and an extension longitudinal direction of the first support 23 parallel to an arrangement direction of the plurality of gear teeth 50. That is, an outer circumferential surface and an inner circumferential surface of the first support 23 are both parallel to the first contact surface 21 and the second contact surface 311. An arc-shaped first concave 231 is formed on a lower portion of the first support 23, such that the first support 23 of the first angle adjustment mechanism 20 can perfectly match with an outer surface of the axle tube of the vehicle axle 10, making the first angle adjustment mechanism 20 can be firmly bonded or welded to the axle tube. The first contact surface 21 is formed on a portion of the first substrate 22. As shown in FIG. 2, the first contact surface 21 is an upwardly concave surface.

As shown in FIG. 4 to FIG. 7, the support base 30 includes a second substrate 32, two second supports 33 and a boss 34. The second supports 33 extend downwardly from opposite left and right sides of the second substrate 32. The boss 34 is substantially column shaped and is arranged on an upper side of the second substrate 32 which is remote from the first angle adjustment mechanism 20. The second substrate 32 is substantially rectangular shaped, with the second angle adjustment mechanism 31 being formed on a lower side of the second substrate 32 which is close to the first angle adjustment mechanism 20. As shown in FIG. 5, the second contact surface 311 is a concave surface facing toward the first substrate 22. The second support 22 is substantially rectangular shaped with an arc-shaped second concave 331 forming on a lower portion of the second support 33. A longitudinal extension direction of second concave 331 is parallel to the arrangement direction of the plurality of gear teeth 50. When the support base 30 is placed on the first angle adjustment mechanism 20, the first angle adjustment mechanism 20 is located between the two second supports 33, and the height of the second support 33 is set in a manner that when the support base 30 is connected to the first angle adjustment mechanism 20, the second concave 331 of the second support 33 abuts against the vehicle body, such as the axle tube of the vehicle axle 10, in order to optimize the force exerted on the support base 30.

In some embodiments, the support base 30 includes a spacer 35, which is arranged at an upper side of the second substrate 32. A C-shaped opening for receiving the boss 34 is defined in the spacer 35. When the spacer 35 is disposed on the second substrate 32, an accommodation space 36 is formed between a side wall of the opening and the boss 34 to accommodate a bottom end of the damper spring.

In this embodiment, the connection structure 40 may include a connection bolt and a nut. Correspondingly, a round connection hole 37 for receiving the connection bolt is formed on the boss 34 of the support base 30. An elongate hole 24 is defined in the first angle adjustment mechanism 20 and extends along the arrangement direction of the plurality of gear teeth 50. That is, the elongate hole 24 extends along the circumferential direction of the first contact surface 21 of the first substrate 22. The connection bolt is capable of passing through the connection hole 37 and the elongate hole 24 and connecting with the nut, to fix the support base 30 on the first angle adjustment mechanism 20. Due to the arrangement of the elongate hole 24, the connection bolt can engage with different positions of the elongate hole 24, such that the support base 30 can have different fixing positions relative to the first angle adjustment mechanism 20. When the first angle adjustment mechanism 20 is bonded or welded on the vehicle body, an operation space is formed between the first support 23, the first substrates 22 and the vehicle body, which is convenient for screwing the nut onto the connection bolt.

In some embodiments, by the arrangement of the first angle adjustment mechanism 20 and the second angle adjustment mechanism 31 between the vehicle body and the support base 30, and the formation of the protrusions and the depressions between the first angle adjustment mechanism 20 and the second angle adjustment mechanism 31, the support base 30 may have different fixing points on the first angle adjustment mechanism 20. Since the first contact surface 21 and the second contact surface 311 are arc-shaped, when the protrusion engages with different depressions, the damper spring support surface of the support base 30 will face to different directions. Through the above arrangement, if the installation angle of the damper spring needs to be adjusted after the vehicle chassis is lifted, it can be adjusted by changing the relative position of the support base 30 on the first angle adjustment mechanism 20, which makes the support base 30 have different orientations, such that the installation angle of the damper spring can be adjusted. Therefore, on the basis of better supporting the damper spring, the orientation angle of the support base 30 can be adjusted as required, which facilitates to fine-tune the vehicle without damage.

Some embodiments may include a vehicle axle 10. The vehicle axle 10 includes the damper spring support and an inner-C-forging 60 beside the damper spring support for connecting with a kingpin knuckle. The first angle adjustment mechanism 20 of the damper spring support is fixed on the axle tube, and the connection structure 40 is capable of detachably fixing the support base 30 on the first angle adjustment mechanism 20 with different installation angles. If the support base 30 is fixed on the first angle adjustment mechanism 20 in different installation angles, the inner-C-forging 60 has different installation angles on the vehicle axle 10.

The above are merely specific embodiments of the present document, but are not intended to limit the protection scope of the present document. Any variations or replacements which will become apparent to those skilled in the art to which the present document pertains, shall also fall within the protection scope of the present document. Therefore, the protection scope of the present document shall be subject to the appended claims

What is claimed is:

1. A damper spring support, comprising:
a first angle adjustment mechanism configured for being fixed to an axle tube of a vehicle body and the first angle adjustment mechanism being stationary relative to the axle tube and comprising a first contact surface parallel to a circumferential surface of the axle tube;
a support base comprising a damper spring support surface configured for supporting a damper spring; and
a connection structure configured for detachably fixing the support base to the first angle adjustment mechanism by passing a portion of the connection structure through the support base and the first contact surface of the first angle adjustment mechanism, and the first angle adjustment mechanism being sandwiched between the axle tube and the support base;
an installation position of the support base to the first angle adjustment mechanism being adjustable along the first contact surface, and an orientation of the damper spring support surface being adjustable, based on an adjustment of the installation position of the support base to the first angle adjustment mechanism.

2. The damper spring support according to claim 1, wherein the installation position of the support base to the first angle adjustment mechanism is adjustable along a circumferential direction of a circle.

3. The damper spring support according to claim 1, wherein the first contact surface is configured in arc shape, the support base has a second angle adjustment mechanism, and the second angle adjustment mechanism has an arc-shaped second contact surface, the installation position of the support base the first angle adjustment mechanism is adjustable with a central axis of the second contact surface forming different angles with a central axis of the first contact surface.

4. The damper spring support according to claim 3, wherein one of the first angle adjustment mechanism and the second angle adjustment mechanism is provided with a plurality of protrusions, the other one of the first angle adjustment mechanism and the second angle adjustment mechanism is provided with a plurality of depressions, the protrusions or the depressions are arranged along a circumferential direction of a corresponding contact surface, each of the protrusions is capable of engaging with several different depressions, making the central axis of the second contact surface have different angles relative to the central axis of the first contact surface.

5. The damper spring support according to claim 4, wherein both of the first angle adjustment mechanism and the second angle adjustment mechanism are provided with a plurality of gear teeth arranged at intervals along respective circumferential directions, the protrusions are the gear teeth, and the depressions are formed between adjacent gear teeth.

6. The damper spring support according to claim 5, wherein a center of a circle which the first or the second contact surface locates is located at a side of the support base which is remote from the damper spring support surface.

7. The damper spring support according to claim 1, wherein the first angle adjustment mechanism has an elongate hole extending along a circumferential direction of a circle, the support base has a connection hole defined therethrough, the connection structure includes a connection bolt for extending through the connection hole and the elongate hole, and a nut for fixing the connection bolt to the support base and the first angle adjustment mechanism.

8. The damper spring support according to claim 7, wherein the first angle adjustment mechanism comprises a first substrate and two first supports disposed at opposite sides of the first substrate, the support base comprises a second substrate and two second supports disposed at opposite side of the second substrate, the first contact surface is arc shaped and formed at an upper side of the first substrate, the second substrate has an arc-shaped second contact surface at a lower side thereof, the elongate hole is defined in the first substrate and extends along a circumferential direction of the first contact surface, the connection hole is defined through the second substrate, when the support base is mounted on the first angle adjustment mechanism, the first contact surface contacts with the second contact surface, with the connection bolt extending through the connection hole and the elongate hole.

9. The damper spring support according to claim 8, wherein the support base further comprises a boss and a spacer, the boss and the spacer are disposed at an upper side of the second substrate, the connection hole is defined through the boss and the second substrate, the spacer comprises an opening for receiving the boss, when the spacer is disposed on the second substrate, an accommodation space is formed between a side wall of the opening and the boss to accommodate a bottom end of the damper spring.

10. The damper spring support according to claim 8, wherein when the first angle adjustment mechanism is fixed to the vehicle body, an operation space is formed between the first support, the first substrates and the vehicle body, which is arranged for screwing the nut onto the bolt.

11. The damper spring support according to claim 1, wherein the support base has a concave which is configured in arc shape, the concave is configured for contacting with the axle tube of the vehicle body, and is movable along a circumferential direction of the axle tube, the concave is capable of contacting with different circumferential positions of the axle tube in response to the adjustment of the installation position of the support base to the first angle adjustment mechanism.

12. A damper spring support, comprising:
a first angle adjustment mechanism configured for being fixed to a vehicle body;
a support base configured for supporting a damper spring; and
a connection structure configured for detachably fixing the support base to the first angle adjustment mechanism;
wherein the first angle adjustment mechanism has an elongate hole, the support base has a second angle adjustment mechanism capable of engaging with different positions of the first angle adjustment mechanism along the elongate hole, the support base is capable of having different installation angles relative to the first angle adjustment mechanism through engagement position changes of the second angle adjustment mechanism and the first angle adjustment mechanism, the connection structure is configured for passing through the support base and the elongate hole, for fixing the support base to the first angle adjustment mechanism.

13. The damper spring support according to claim 12, wherein in response to the second angle adjustment mechanism of the support base is engaged with different positions of the first angle adjustment mechanism, a central axis of the support base forms different angles with a central axis of the first angle adjustment mechanism along a circumferential direction of a circle.

14. The damper spring support according to claim 12, wherein the first angle adjustment mechanism has an arc-shaped first contact surface, the second angle adjustment mechanism has an arc-shaped second contact surface, one of the first contact surface and the second contact surface is provided with a plurality of protrusions, the other one of the first contact surface and the second contact surface is provided with a plurality of depressions, the protrusions or the depressions are disposed along a circumferential direction of a corresponding contact surface, each of the protrusions is capable of engaging with several different depressions, making the second contact surface have different installation angles relative to the first contact surface.

15. The damper spring support according to claim 12, wherein the elongate hole extends along a circumferential direction of a circle, the support base has a connection hole defined therethrough, the connection structure includes a connection bolt for extending through the connection hole and the elongate hole, and a nut for fixing the connection bolt to the support base and the first angle adjustment mechanism.

16. The damper spring support according to claim 15, wherein the first angle adjustment mechanism comprises a first substrate and two first supports disposed at opposite sides of the first substrate, the support base comprises a second substrate and two second supports disposed at opposite side of the second substrate, a first contact surface is formed at an upper side of the first substrate, a second contact surface is formed at a lower side of the second substrate, the elongate hole is defined in the first substrate, the connection hole is defined through the second substrate, when the support base is mounted on the first angle adjustment mechanism, the first angle adjustment mechanism is disposed between the second supports.

17. A vehicle axle, comprising:
a damper spring support, comprising:
a first angle adjustment mechanism configured for being fixed to an axle tube of a vehicle body;
a support base configured for supporting a damper spring; and
a connection structure configured for detachably fixing the support base to the first angle adjustment mechanism by passing a portion of the connection structure through the support base and the first angle adjustment mechanism, with an extension direction of an axis of the connection structure intersecting with the axle tube, an installation position of the support base to the first angle adjustment mechanism being adjustable, and an angle formed between the extension direction of the axis of the connection structure and a vertical direction being adjustable, in response to an adjustment of the installation position of the support base to the first angle adjustment mechanism.

18. The vehicle axle according to claim 17, wherein the first angle adjustment mechanism has an elongate hole extending along a circumferential direction of a circle, the support base has a connection hole defined therethrough, the connection structure includes a connection bolt for extending through the connection hole and the elongate hole, and a nut for fixing the connection bolt to the support base and the first angle adjustment mechanism.

19. The vehicle axle according to claim 18, wherein the first angle adjustment mechanism has an arc-shaped first contact surface, the support base has a second angle adjustment mechanism, and the second angle adjustment mechanism has an arc-shaped second contact surface, one of the first contact surface and the second contact surface is provided with a plurality of protrusions, the other one of the first contact surface and the second contact surface is provided with a plurality of depressions, the protrusions or the depressions are disposed along a circumferential direction of a corresponding contact surface, each of the protrusions is capable of engaging with several different depressions, making the second contact surface have different installation angles relative to the first contact surface.

20. The vehicle axle according to claim 19, wherein the first angle adjustment mechanism comprises a first substrate and two first supports disposed at opposite sides of the first substrate, the support base comprises a second substrate and two second supports disposed at opposite side of the second substrate, the first contact surface is formed at an upper side of the first substrate, the second contact surface is formed at a lower side of the second substrate, the elongate hole is defined in the first substrate, the connection hole is defined through the second substrate, when the support base is mounted on the first angle adjustment mechanism, the first angle adjustment mechanism is disposed between the second supports.

* * * * *